US012680822B2

(12) United States Patent (10) Patent No.: US 12,680,822 B2
Weld et al. (45) Date of Patent: Jul. 14, 2026

(54) PREDICTING VEHICLE TRAVEL RANGE

(71) Applicant: Signal4D, Inc., Seattle, WA (US)

(72) Inventors: David Low Weld, Seattle, WA (US);
Mark Stuart Carroll, Seattle, WA
(US); Dmitry Kaplan, Bellevue, MA
(US)

(73) Assignee: Signal4D, Inc., Seattle, WA (US)

( * ) Notice: Subject to any disclaimer, the term of this
patent is extended or adjusted under 35
U.S.C. 154(b) by 7 days.

(21) Appl. No.: 19/014,707

(22) Filed: Jan. 9, 2025

(65) Prior Publication Data

US 2025/0146828 A1 May 8, 2025

Related U.S. Application Data

(63) Continuation of application No. 17/963,470, filed on
Oct. 11, 2022, now Pat. No. 12,196,566.

(51) Int. Cl.
*G01C 21/34* (2006.01)
*B60L 58/13* (2019.01)
*G01C 21/36* (2006.01)

(52) U.S. Cl.
CPC .......... *G01C 21/3469* (2013.01); *B60L 58/13*
(2019.02); *G01C 21/3492* (2013.01); *G01C*
*21/3691* (2013.01); *B60L 2240/66* (2013.01);
*B60L 2240/68* (2013.01); *B60L 2250/16*
(2013.01); *B60L 2260/52* (2013.01)

(58) Field of Classification Search
CPC ............. B60L 2240/66; B60L 2240/68; B60L
2250/16; B60L 2260/52; B60L 58/13;
G01C 21/3469; G01C 21/3492; G01C
21/3691
See application file for complete search history.

(56) References Cited

U.S. PATENT DOCUMENTS

| | | | |
|---|---|---|---|
| 9,213,670 | B2 | 12/2015 | Edgren |
| 10,295,362 | B2 | 5/2019 | Choi et al. |
| 10,360,519 | B2 | 7/2019 | Mu et al. |
| 11,200,757 | B2 | 12/2021 | Maeda |
| 12,196,566 | B2 | 1/2025 | Weld et al. |
| 2010/0094496 | A1 | 4/2010 | Hershkovitz et al. |
| 2010/0138098 | A1 | 6/2010 | Takahara et al. |
| 2010/0138142 | A1 | 6/2010 | Pease |
| 2012/0158229 | A1 | 6/2012 | Schaefer |
| 2012/0179319 | A1 | 7/2012 | Gilman et al. |

(Continued)

FOREIGN PATENT DOCUMENTS

WO 2024081185 A1 4/2024

*Primary Examiner* — Carl C Staubach

(74) *Attorney, Agent, or Firm* — Mintz, Levin, Cohn,
Ferris, Glovsky and Popeo, P.C.

(57) ABSTRACT

Provided are systems and methods for predicting a travel
range of a vehicle. The method comprises receiving, using
at least one processor, travel information associated with the
vehicle, receiving, using the at least one processor, a weather
forecast and a traffic forecast associated with the travel
information, and predicting, using the at least one processor,
the predicted travel range based at least in part on a battery
charge level of the vehicle, the weather forecast, and the
traffic forecast. In embodiments, the predicted travel range
may be based on current and historical battery charge levels,
current and/or historical battery discharge rates, weather
forecast data, and traffic forecast data.

18 Claims, 8 Drawing Sheets

(56)                References Cited

U.S. PATENT DOCUMENTS

| | | | |
|---|---|---|---|
| 2012/0179420 A1 | 7/2012 | Gilman et al. | |
| 2015/0073702 A1 | 3/2015 | Jouaux et al. | |
| 2015/0149221 A1 | 5/2015 | Tremblay | |
| 2015/0345984 A1 | 12/2015 | Graham | |
| 2021/0012584 A1 | 1/2021 | Saavedra Roman | |
| 2024/0027212 A1 | 1/2024 | Bhambare et al. | |
| 2024/0118099 A1 | 4/2024 | Weld et al. | |
| 2024/0362232 A1* | 10/2024 | Weld | G06F 16/24568 |

* cited by examiner

310

312

314

316

318

311

102

Battery Charge Level

92%

Weather Conditions

Partly Cloudy

Likelihood of Traffic

Medium

Predicted Travel Range

195

Battery Charge Level on Arrival

47%

214

PREDICTING VEHICLE TRAVEL RANGE

RELATED APPLICATION

This application is a continuation of U.S. patent application Ser. No. 17/963,470, filed on Oct. 11, 2022, entitled "Predicting Vehicle Travel Range". The above identified application is hereby incorporated by reference in its entirety.

BACKGROUND

Conventional vehicle navigation technologies enable vehicles to travel from source to destination locations along a particular planned route, e.g., based on Global Positioning System (GPS) data. These technologies fail, however, to update routes from source to destination locations based on variations in weather and traffic conditions.

Accordingly, a vehicle navigation system that determines and dynamically updates route data based on factors in addition to GPS data is contemplated.

SUMMARY

In an aspect, a method for predicting a travel range of a vehicle is provided. The method comprises receiving using at least one processor, travel information associated with the vehicle; receiving, using the at least one processor, a weather forecast and a traffic forecast associated with the travel information; and predicting, using the at least one processor, the travel range based on a battery charge level of the vehicle, the weather forecast, and the traffic forecast.

In another aspect, a system, comprising at least one processor, and at least one non-transitory storage media storing instructions that, when executed by the at least one processor, cause the at least one processor to perform operations comprising receiving travel information associated with a vehicle; receiving a weather forecast and a traffic forecast associated with the travel information; and predicting a travel range based on a battery charge level of the vehicle, the weather forecast, and the traffic forecast.

DETAILED DESCRIPTION

Figure 1:
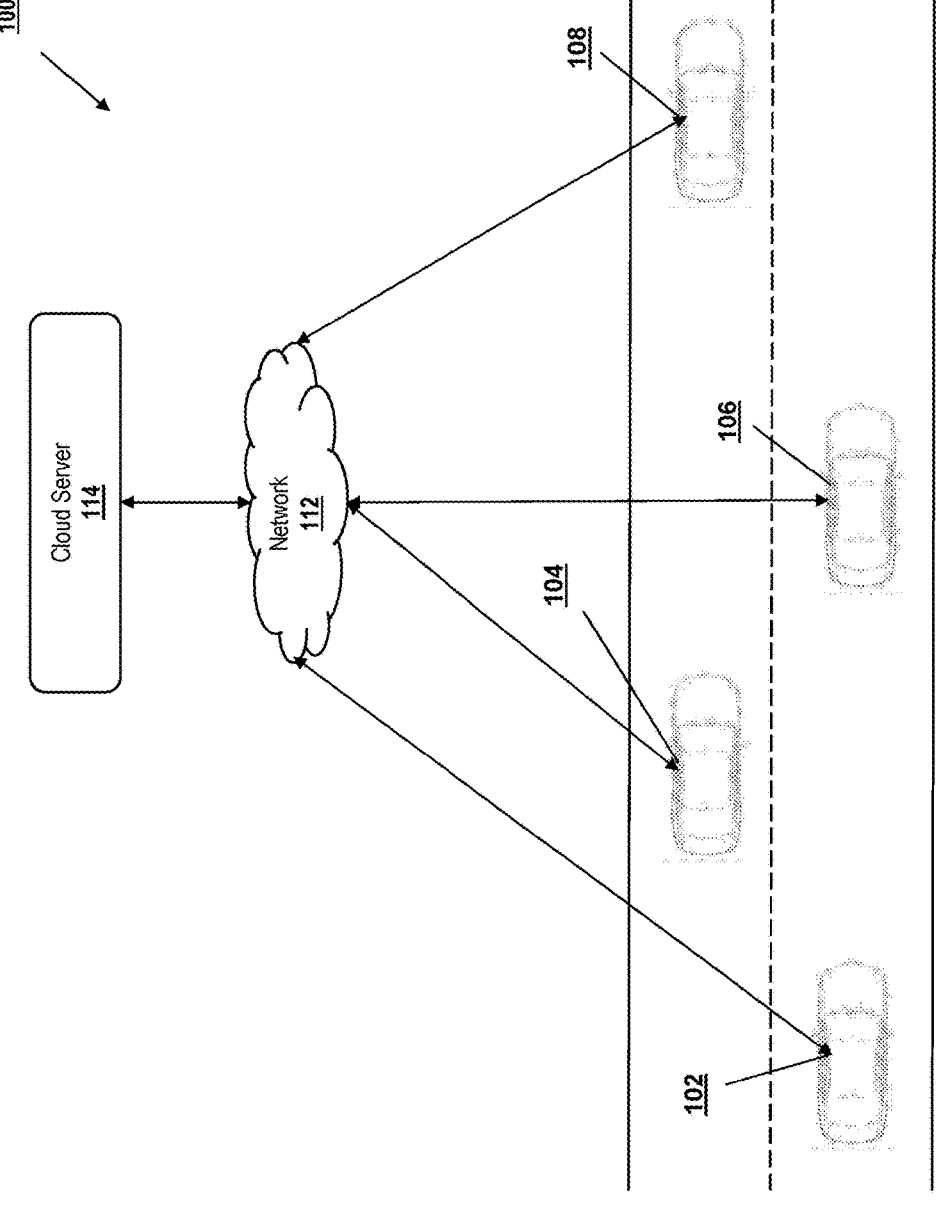
FIG. 1 depicts an environment in which each of a plurality of vehicles implement a travel range prediction system, according to one or more embodiments described and illustrated herein.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as is needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units are in communication with each other even though the information transmitted is modified, processed, relayed, and/or routed between the first and second unit. For example, a first unit is in communication with a second unit even though the first unit passively receives information and does not actively transmit information to the second unit. As another example, a first unit is in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

As described herein, a vehicle (such as an electric vehicle and/or a drone) can include and/or be in wireless communication with a system that accurately determines predicted travel ranges of the vehicle based on a battery charge level. For example, the battery charge level includes one or more of a current battery charge level of the vehicle, a historical battery charge level of the vehicle (e.g., based on similar driving distance, condition, etc.), a current battery drain or discharging rate (e.g., a time-based and/or mileage based rate at which the battery is currently loosing charge), and a historical battery drain or discharging rate (e.g., a time-based and/or mileage based rate at which the battery has historically drained or discharged under same/similar driving distance, condition, etc.). For example, the predicted travel ranges can be based on travel information associated with the vehicle, such as a source and destination location, a current location, and a planned route of the vehicle. Additionally, the predicted travel ranges can be determined based on a weather forecast associated with the travel information, such as the current and predicted conditions of the atmosphere at the current location and along the planned route. It is noted that the weather data may be acquired from one or more commercial and/or governmental sources. It is further noted that the acquired weather data (e.g., inputs associated with weather that are utilized, at least in part, to predict the travel ranges) are available to the vehicle with the use of one or more internal components of the vehicle, e.g., as probability density functions (i.e. distributions). In other words, the weather data that is accessed by the vehicle, and which serves, at least in part, as inputs for predicting travel ranges may be based on probability distributions and not merely, e.g., point forecasts.

The predicted travel ranges can also be determined based on a traffic forecast that includes impacts on travel at the vehicle's current and planned locations, such as due to traffic and road conditions. As another example, driving characteristics of the vehicle's driver and/or conditions of the vehicle can also be used to more accurately determine predicted travel ranges. Furthermore, the predicted travel ranges can be updated to reflect any changes in at least the travel route, weather, and/or traffic. The system can also provide recommendations and information to the user, and modify vehicle settings and/or travel routes, to achieve safe and efficient travel by the vehicle.

Some of the advantages of the system include providing drivers with more accurate information regarding travel distances of a vehicle based on current and expected conditions, such as weather and traffic along a planned route. For example, weather impacts the safety and efficiency of travel. The current system considers current and real-time forecasted weather and traffic to plan safe and efficient driving times and routes. The system can also provide information to the driver and/or automatically modify parameters of the vehicle (e.g., update planned driving times and routes) to achieve optimally safe and efficient travel by the vehicle. Furthermore, the system determines and continually updates information based on current and real-time forecasts of weather and traffic, thereby continually optimizing safe and efficient travel in real-time.

Figure 2:
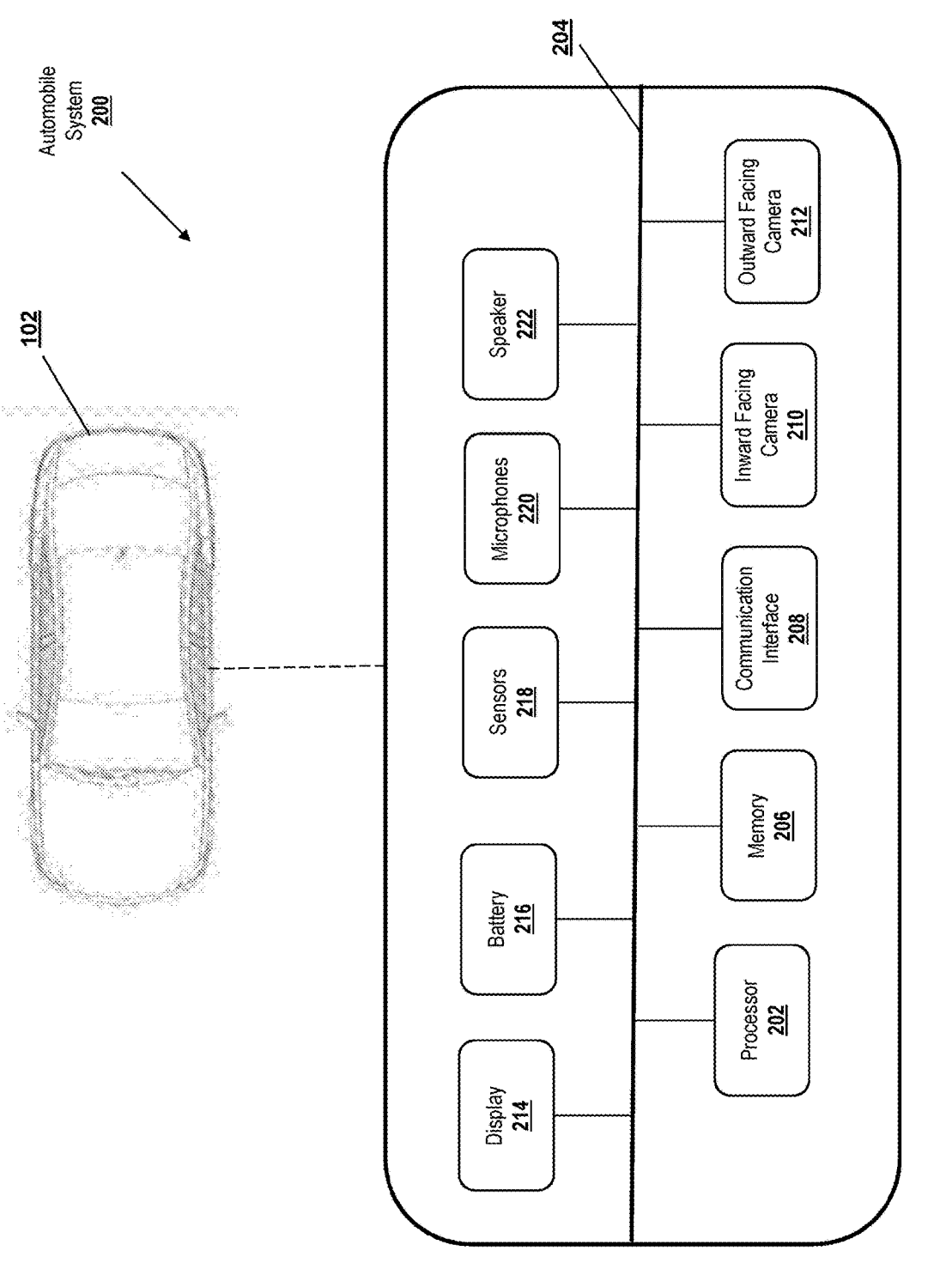
FIG. 2 depicts an example implementation of an automobile system that is included in one or more of the vehicles illustrated in FIG. 1, according to one or more embodiments described and illustrated herein.

FIG. 1 depicts an example environment 100 in which each of a plurality of vehicles implement a travel range prediction system, according to one or more embodiments described and illustrated herein. In particular, FIG. 1 depicts vehicles 102, 104, 106, and 108. Each of the vehicles 102, 104, 106, and 108 includes an automobile system, as illustrated in FIG. 2, that controls operation of these vehicles. In embodiments, the automobile systems of the vehicles 102, 104, 106, and 108 communicate with the cloud server 114 (e.g., one or more servers), which stores data and/or enables access to data associated with weather conditions, traffic conditions, and so forth, in real time. For example, in embodiments, the cloud server 114 may communicate with one or more additional servers that store and/or enable access to real time variations in traffic conditions, weather conditions, and so forth. In embodiments, the communication may occur via a communication network 112 with the use of a standard protocol, e.g. TCP/IP. In embodiments, the automobile systems may include respective interactive displays that display interactive digital pages, into which users may input source and destination locations. Based on these locations, in embodiments, a route is predicted by the automobile systems by implementation of software (e.g., one or more software applications). In embodiments, the travel range prediction system as described in the present disclosure includes each of the automobile systems implementing software that enables the prediction of travel ranges for the vehicles 102, 104, 106, and 108.

In other embodiments, the predicted route is based on weather conditions data, traffic forecast data, travel information (e.g., source and destination locations, a current location, a planned route of the vehicle 102, etc.), and at least one condition of the vehicles 102, 104, 106, and 108. For example, in some embodiments, the at least one condition of a vehicle may include a battery charge level (e.g., current and historical charge levels and discharge rates), vehicle temperature, vehicle weight, payload, vehicle operating conditions, make model, and so forth. In embodiments, the travel range prediction system predicts a travel range from the source to the destination location and dynamically updates the travel range prediction based at least on variations in weather and traffic conditions. Any changes in the weather and/or traffic conditions are utilized to determine a battery charge level on arrival at the destination location and/or update or modify, including in approximately real-time, a predicted battery charge level on arrival at destination location. Further, in embodiments, one or more recommendations are generated and output on the respective displays of the vehicles 102, 104, 106, and 108 in order to aid in the identification of points of interest to a user, such as for identifying electrical charging stations in the event that the battery charge level on arrival is predicted to be below a threshold level (e.g., 10% battery charged, 5% battery charged, etc.). Further, vehicle loading and unloading, ride sharing, and other such points of interest are also included as part of the one or more recommendations.

FIG. 2 depicts an example implementation of an automobile system 200 that are installed as part of the vehicle 102 (and the vehicle 104, 106, and 108), according to one or more embodiments described and illustrated herein. In embodiments, the automobile system 20 may include a processor 202 that is designed in the form of or is an electronic control unit. The processor 202 is designed in the form of integrated circuits, microchips, microcomputers, computing devices, and so forth.

As shown in FIG. 2, a communication path 204 may allow data to be shared among various components of the automobile system 200. The communication path 204 may include communication buses or comparable components. In embodiments, the communication buses are formed of wires, optical waveguides, and so forth. In embodiments, the communication path 204 may serve to route data (e.g., data signals) of various sizes from one component to another within the automobile system 200. In embodiments, the communication path is composed of connectors, conductive wires, traces, etc., and facilitates the transmission of data to and from the processor 202 to various components within the automobile system 200. In embodiments, the communication path 203 is formed of a Local Integrated Network (LIN) bus, Controller Area Network (CAN bus), and so forth. In embodiments, the LIN bus is a single wire, serial network protocol that supports communications up to 19.2 kilobits/second at a bus length of 40 meters. In embodiments, the CAN bus is a robust vehicle bus standard that is designed to allow microcontrollers and devices to communicate with each other's applications without a host computer. In embodiments, the term data signals or "signals" refer to a signal that is based on, e.g., direct current, alternating current, sound, vibration, magnetic, optical, electrical, and so forth.

The memory 206 may comprise RAM, ROM, flash memories, hard drives, or any devices capable of storing machine readable and executable instructions, which, when executed, enables the travel range prediction system to perform one or more actions as described in the present disclosure, such as predict a travel range, update a predicted travel range, and predict a battery charge level, e.g., when the vehicle arrives at a destination. It is noted that the prediction of the battery charge level on arrival may be based on various factors, e.g., analysis of current and historical battery charge levels, current and historical drain or discharge rates, traffic forecast data, weather forecast data, and so forth. The machine readable and executable instructions may comprise logic or algorithm(s) associated with various programming languages, e.g., assembly language, object-oriented programming (OOP), scripting languages, microcode, etc. Such logic or such algorithms are compiled or assembled into machine readable and executable instructions and stored on the one or more memory modules. Alternatively, the machine readable and executable instructions are written in a hardware description language (HDL), such as logic implemented via either a field-programmable gate array (FPGA) configuration or an application-specific integrated circuit (ASIC), or their equivalents. Accordingly, the methods described herein are implemented in any conventional computer programming language, as pre-programmed hardware elements, or as a combination of hardware and software components. In some embodiments, the memory may store data related to weather conditions, traffic conditions, battery charge levels, and so forth. The stored data is updated in real time. It is noted that data associated with weather conditions, traffic conditions, battery charge levels, and so forth, may include current and historical weather conditions and patterns data, current and historical traffic conditions and patterns data, current and historical battery charge levels data, and current and historical current drain and discharge levels data.

The communication interface 208 is in the form of a chip card or chipset that includes one or more microcontrollers or microprocessors that are configured to execute one or more instructions, which enable the travel range prediction system of the present disclosure to predict a travel range for the vehicle. For example, the predicted travel range for the vehicle is based on at least one of weather conditions, traffic conditions, battery charge levels (current and historical battery charge levels and discharge rates), and so forth. Further, current and historical current drain or discharge rates may also be analyzed to predict the travel range for the vehicle.

The inward facing camera 210 and the outward facing camera 212 are communicatively coupled to the communication path 204 and route data in the form of image data, live video stream data, and so forth, in real time to the processor 202 for further processing and to the memory 206 for storage. In embodiments, the inward facing camera 210 are capable of capturing high resolution images of the driver and the passenger, namely for the purposes of determining reactions of the driver and the passenger in various situations, e.g., pupil dilations, facial contortions, and so forth. In embodiments, such data, when analyzed, is utilized to determine stress, anger, fear, and so forth. The outward facing camera 212 is utilized to capture images or a live video stream of an environment that is external to the vehicles 102, 104, 106, and 108. In embodiments, these cameras are capable of detecting light in the ultraviolet wavelength band, a visible light wavelength band, an infrared wavelength and, and so forth. In embodiments, these cameras include a broad angle feature that enables capturing digital content within approximately a 150 degree arc range.

The display 214 is communicatively coupled to the communication path 204 and is configured to output interactive digital images in real time. The drivers and/or passengers of the vehicle 102 may interact with one or more icons displayed in these interactive digital pages, e.g., to input information related to source and destination locations. Additionally, in embodiments, one or more of the interactive digital images are updated based on newly acquired weather data, traffic data, vehicle data, and so forth. In embodiments, the display 214 is an in-vehicle infotainment unit that is configured to deliver entertainment information to the driver and passengers, such as through audio/video interfaces, control elements like ouch screen displays, button panels, and so forth. In embodiments, the in-vehicle infotainment unit includes a touch screen and displays various types of vehicle data, such as vehicle speed, navigation maps, electronic digital cluster information (e.g., obtained from a vehicle's On-Board Diagnostics port). In embodiments, the display 214 is interconnected with the vehicle 102 via communication path 204 and is operable to communicate with various other components within the vehicle 102, e.g., via particular communication protocols such as, e.g., Controller Area Network (CAN). Further, in embodiments, the display 214 includes GPS, WiFi, and Bluetooth modules and components that provide connectivity with various external networks and devices. In embodiments, the display 214 also includes proximity sensors, gesture recognition sensors, camera sensors, and so forth, installed as part of the display 214.

In embodiments, the battery 216 is formed of Lithium-ion, Nickel-metal hydride, and other such comparable materials. In embodiments, capacities of these batteries is expressed in terms of Kilowatt-hours, e.g., abbreviated as kWh.

In embodiments, the sensors 218 include IR sensors, motions sensors, proximity sensors, touch sensors, and so forth. Each of these sensors is communicatively coupled to the communication path 204 and routes data to the processor 202 for further processing and the memory 206 for storage.

In embodiments, the microphones 220 are MEMS microphones that possess a noise cancellation capability. In embodiments, the microphones 220 improve speech intelligibility and enable the capture of distortion free speech. Other comparable microphones are also contemplated.

In embodiments, the speaker 222 includes tweeters, mid-range frequency based speakers, woofers, subwoofers, and so forth. In embodiments, tweeters output high frequency sounds, such as bells, vehicle horns, etc., while mid-range frequency based speakers and woofers output sounds in all remaining frequencies.

Figure 3A:
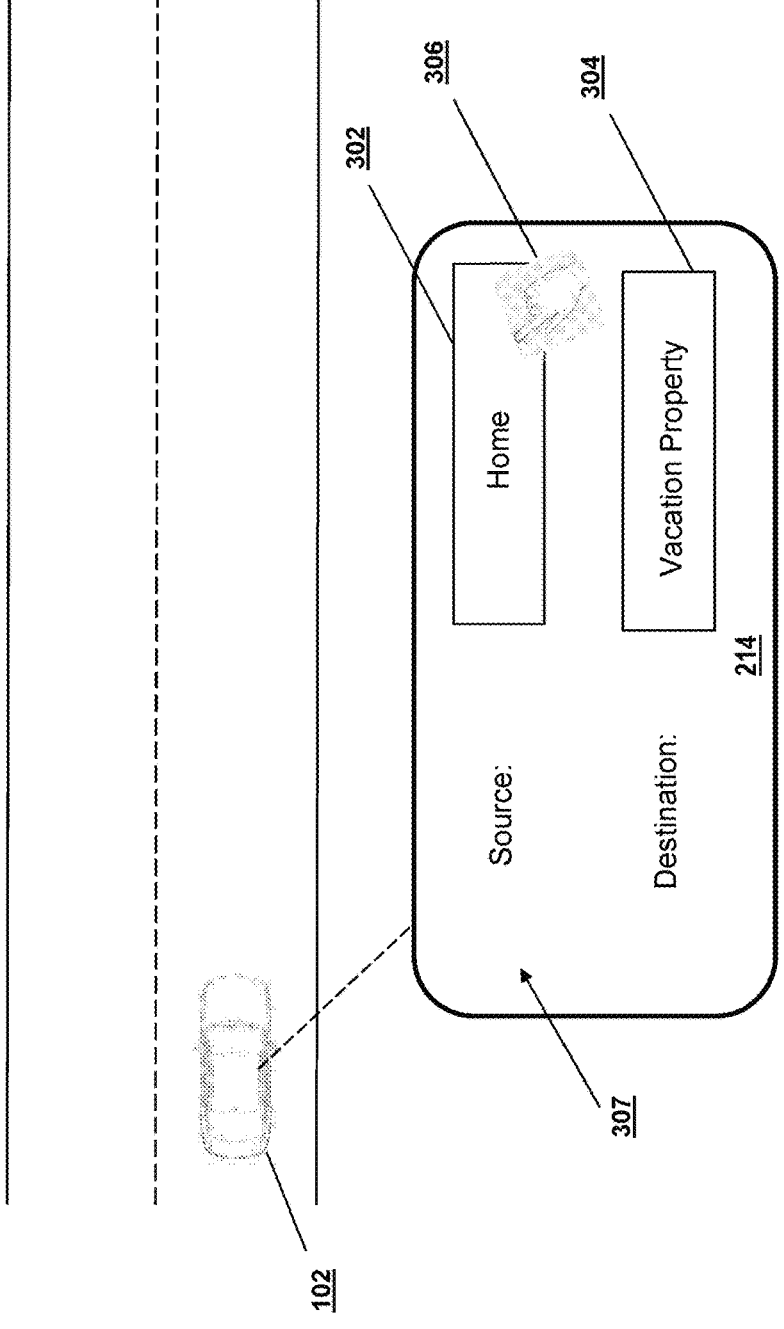
FIG. 3A depicts an interactive digital page of the travel range prediction system of the present disclosure that is output on the display of the vehicle, according to one or more embodiments described and illustrated herein.

FIG. 3A depicts an interactive digital page 307 of the travel range prediction system of the present disclosure that is output on the display 214 of the vehicle 102, according to one or more embodiments described and illustrated herein. In some embodiments, the travel range prediction system includes a software application that, in operation, results in an output of the interactive digital page that is presented on the display 214. For example, as illustrated in FIG. 3A, the interactive digital page includes a source location text field

302 and the destination location text field 304 in which respective source and destination locations are input. The inputs for the source and/or destination locations can be addresses, landmarks, location name, etc. For example, in embodiments, a user inputs a location name as the source location (e.g., current location, planned starting location), such as the user's "Home" with the address of the user residence stored in association with the term "Home". In some embodiments, the display 214 is a touch screen based display and the user contacts at least a portion of the screen in order to input data. In some embodiments, the user contacts one or more buttons positioned adjacent to the display 214 in order to interact with the interactive digital page, e.g., scroll through various portions of the interactive digital page and enter information in the form of text. It is noted, however, that the travel range prediction system of the present disclosure predicts a travel range in association with multiple locations spread across a wide geographic area such that the system does not require inputs in the form of a particular source and a particular destination location for generating the predicted travel range. For example, a broad geographic area (e.g., 10 square miles, 20 square miles, and so forth) may be identified and it may be determined that this broad geographic area has particular current and historical weather conditions, current and historical traffic patterns, and so forth, which affect the travel range prediction in various ways. In embodiments, it is noted that the predicted travel range (e.g., particular routes connecting one or locations) may be stored in various formats, e.g., a polyline format, geojson format, a vector format of latitudes and longitudes, and so forth.

In some embodiments, the user inputs the location name "Vacation Property" as a destination location, and the address is identified and associated with a destination location (e.g., a time share, a vacation home or apartment, etc.). In embodiments, the software application, as described in the present disclosure, accesses data stored within one or more servers that are external to the automobile system 200. The accessed data is utilized to map a route, in real time, from the source location to the destination location. In some embodiments, the automobile system 200 communicates with the cloud server 114 (which is a single server or a combination of one or more servers that operate in conjunction with each other).

In some embodiments, a user may interact with the interactive digital page by speaking a command. For example, in some embodiments, the user speaks a command such as, "Map route to the vacation property", which is detected by one or more of the microphones 220. The voice command, subsequent to the detection, is routed, via the communication path 204, to the memory 206 for storage and the processor 202 for further processing. In embodiments, the processor 202 analyzes the subject matter of the voice command using one or more of a plurality of speech and natural language processing techniques.

Figure 3B:
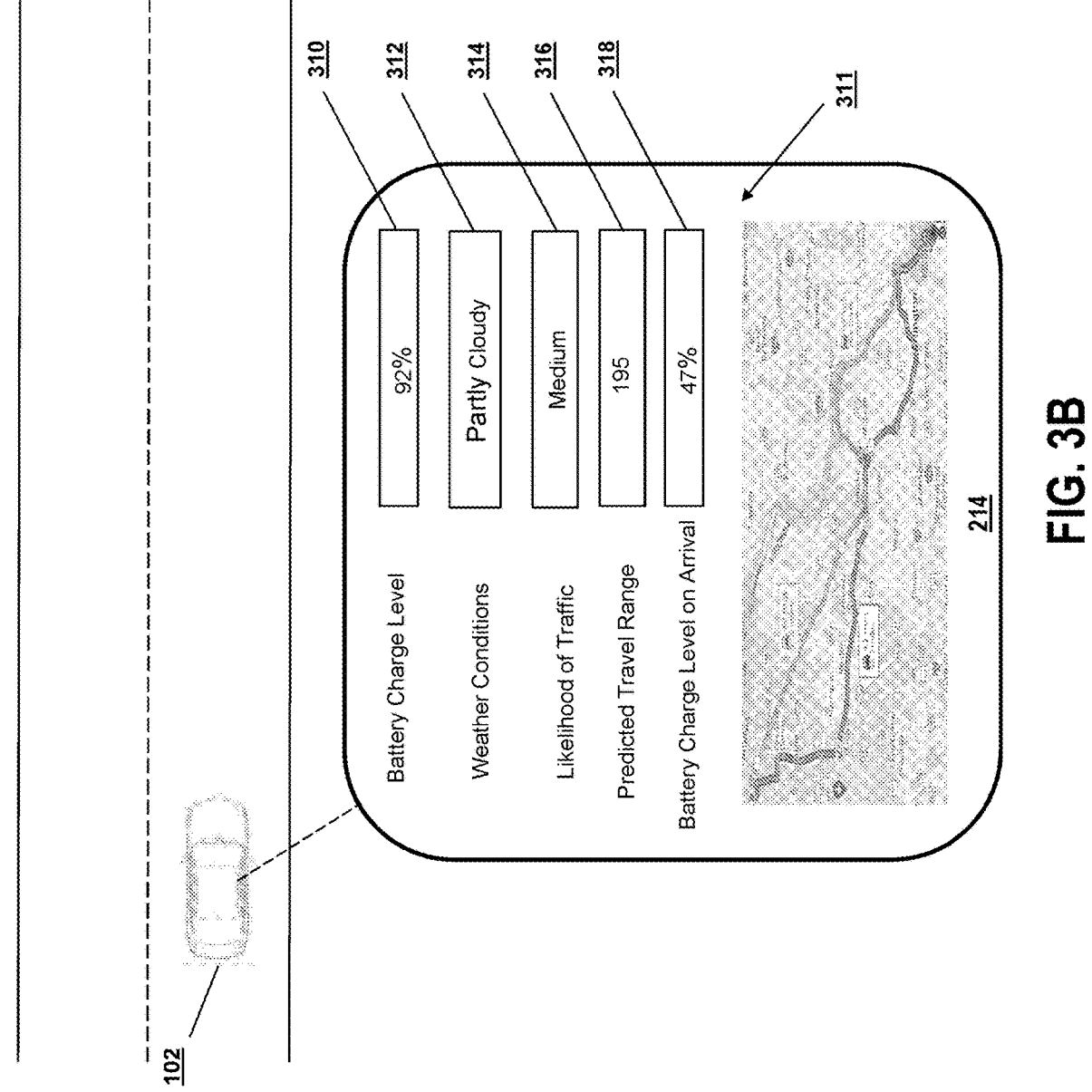
FIG. 3B depicts an interactive digital page in which a travel range prediction is listed along with a plurality of other data, according to one or more embodiments described and illustrated herein.

FIG. 3B depicts an interactive digital page 311 in which a travel range prediction is listed along with a plurality of other data, according to one or more embodiments described and illustrated herein. In some embodiments, upon receiving the source and destination locations, as illustrated in FIG. 3A, the travel range prediction system of the present disclosure, accessible via and operating in combination with the automobile system 200 and the cloud server 114 (e.g., one or more third party servers that are external to the vehicle 102), accesses travel information specific to the source location and the destination location.

In embodiments, the processor 202 communicates with the cloud server 114, accesses travel information in the form of, e.g., map data, GPS data, and so forth, and receives this data from the cloud server 114, e.g., in real time. In embodiments, as a non-limiting example, the map data refers to data characterizing highways, city streets, traffic signs, landmarks, points of interest, and so forth. Other comparable location data is contemplated as being accessed. Further, the processor 202 communicates with the cloud server 114 to access weather forecast data and traffic forecast data, both of which are also specific to the travel information. For example, given a particular source and destination location, as described above and illustrated in FIG. 3A, the travel range prediction system communicates with various external sources (e.g., the cloud server 114) to obtain travel information, weather forecast data, and travel forecast data associated with the travel information (e.g., the source and destination locations).

In embodiments, based on the source and destination locations of "Home" and "Vacation Property", as illustrated in FIG. 3A, the automobile system 200 identifies a current time (e.g., a time that is within a particular proximity of the time at which the user input the source and destination data into the interactive digital page) as the starting time and obtains travel information, weather data, traffic data, and so forth along a route from the source to the destination location. Additionally, in embodiments, the software application is configured to map a route in accordance with a particular start time other than a current time, e.g., a future time on the same day, a different day, and so forth. In embodiments, the automobile system 200 determines a distance between source and destination locations and then determines a travel range based on one or more factors, e.g., fastest time, shortest distance, a scenic route, and so forth. The travel range determination is modified or adjusted based on various factors, namely weather conditions, traffic conditions, and battery charge level.

In embodiments, the automobile system 200 accesses weather data, traffic data, and map data on a real time basis and stores all of this data in memory 206 of the automobile system 200. In embodiments, the weather data is accessed from one or more databases of a plurality of sources, e.g., The Weather Channel (TWC), Weather Underground, Accuweather, National Weather Service, and so forth. In embodiments, it is noted that these sources may be based on paid subscriptions, free data sources, government sources, corporate sources, and so forth. In embodiments, the sources of weather data include, e.g., high and low orbit satellites, terrestrial radar, weather balloons, terrestrial sensors, and various inputs used in weather modeling applications. In embodiments, examples of weather data include wind speed, volume and intensity of rain and snow, intensity of fog, elevation data, temperature, humidity, barometric pressure, and so forth. In embodiments, the weather data, traffic data, and map data that is accessed are in accordance with a temporal cadence or frequency, e.g., every five minutes, every ten minutes, every fifteen minutes, and so forth. Additionally, the weather data, traffic data, and map data may also match a particular spatial granularity that matches the source of the data, e.g., the weather channel, weather underground, and so forth. For example, if data is received by the automobile system at a resolution of 2K, this resolution is maintained by the automobile system 200. As such, a particular threshold level of quality and accuracy of the data is maintained, which facilitates determining and updating a travel range prediction with improved accuracy.

In embodiments, the accessing of the data may occur at intervals of, e.g., in real time or substantially instantaneously, every five minutes, every ten minutes, every fifteen minutes, and so forth. As such, in embodiments, the predicted travel range is dynamically updated to reflect the distance and/or time that the vehicle 102 has to travel in order to reach the destination, which is affected by the weather data, traffic data, and so forth. In embodiments, another factor that affects the predicted travel range is the battery charge level. In embodiments, the battery charge level may vary during a particular route of the vehicle 102 for various reasons, and this factor, analyzed in conjunction with variations in the weather data and traffic data results in the dynamic updating of the predicted travel range. In embodiments, examples of the weather data includes intensity of rain, approaching storms, wind speed, snow, and so forth. The weather data is associated with current and future weather conditions. In embodiments, the travel range prediction system is also configured to predict the travel range based on various factors such as, e.g., terrain, altitude, battery temperature, climate, travel speed, payload, and so forth. As stated above, the prediction of the travel range may also involve analyzing and comparing battery charge levels, weather data, traffic data, and so forth, including data representative of historical and current battery charge levels and discharge rates, historical records and variations in weather and temperature data, historical records and variations in traffic patterns, and so forth.

Returning to FIG. 3B, based on analyzing the battery charge level of the vehicle 102, the travel information, weather data, and traffic data that is obtained, the automobile system 200 may output a travel range prediction 316 on the display 214. Additionally, in some embodiments, the automobile system 200 may also output data specific to the weather conditions, traffic conditions, and an anticipated battery charge level on arrival. For example, in embodiments, the automobile system 200, operating in combination with the software application of the travel range prediction system, outputs a battery charge level 310 (e.g., 92%) (e.g., a current battery charge level), a current weather condition 312 (e.g., partly cloudy), a current likelihood of traffic value 314 (e.g., medium), and a battery charge level on arrival 318 (e.g., 47%). It is noted that, in embodiments, other variables and values are also contemplated, e.g., historical battery charge levels, current and historical battery discharge rates, historical weather and temperature data, and so forth. It is further noted that each of these values are dynamically updated, e.g., in real time. In embodiments, the weather and traffic conditions are associated with current weather and traffic conditions and future weather and traffic conditions. In embodiments, a likelihood of traffic being designated as "medium" is accompanied by a probability value, e.g., 40%, 50%, 60% and so forth. In embodiments, low and high likelihoods are associated with 1-30% and 70-100%, respectively. In embodiments, various factors result in a dynamic and approximately real time updating of the predicted travel range, e.g., sudden changes in weather conditions, traffic conditions, and so forth. Other factors include a voluntary detour or deviation from a planned route that is taken by the user.

In embodiments, it is noted that variations in weather and traffic conditions affect the operational capability of the battery 216, namely a particular range that the vehicle 102 is capable of traveling as a result of variations in weather and traffic conditions. For example, a likely speed of vehicle travel may be decreased or increased as a result of improvement in or deterioration of weather and/or traffic conditions.

In embodiments, analyzing historical averages, e.g., performing an analysis of historical weather and traffic data and correlating this data with vehicle travel times, is a technique that is utilized to determine and update travel range predictions. In embodiments, the automobile system 200 predicts and adjusts an average speed of the vehicle 102 based on the variations in weather and traffic conditions. This enables for a more accurate prediction of a travel range of the vehicle 102, namely a travel range prediction that accurately determines a distance that the vehicle 102 is capable of traveling, e.g., by incorporating the effect of the adjustment of the speed of the vehicle on the capacity and range of the battery 216.

In embodiments, the automobile system 200 determines an amount of energy that may have to be burned as a result of climate control, e.g., due to an extend amount of time that the battery 216 has to operate in order to operate the vehicle 102. Further, variations in weather and traffic conditions may also affect temperatures within the vehicle 102, which in turn affects battery performance. These are non-limiting examples of factors that affect performance of the battery 216. Further, it is noted that temperature data portion of the weather data, when monitored along a particular route and at various times during the route, enables for a determination an efficiency level of the battery 216, e.g., where on the battery efficiency curve the battery 216 performs well, e.g., operates with a particular threshold level of efficiency. Further, temperature data analysis also enables for a better determination of the manner in which climate within the vehicle 102 is controlled.

Figure 3C:
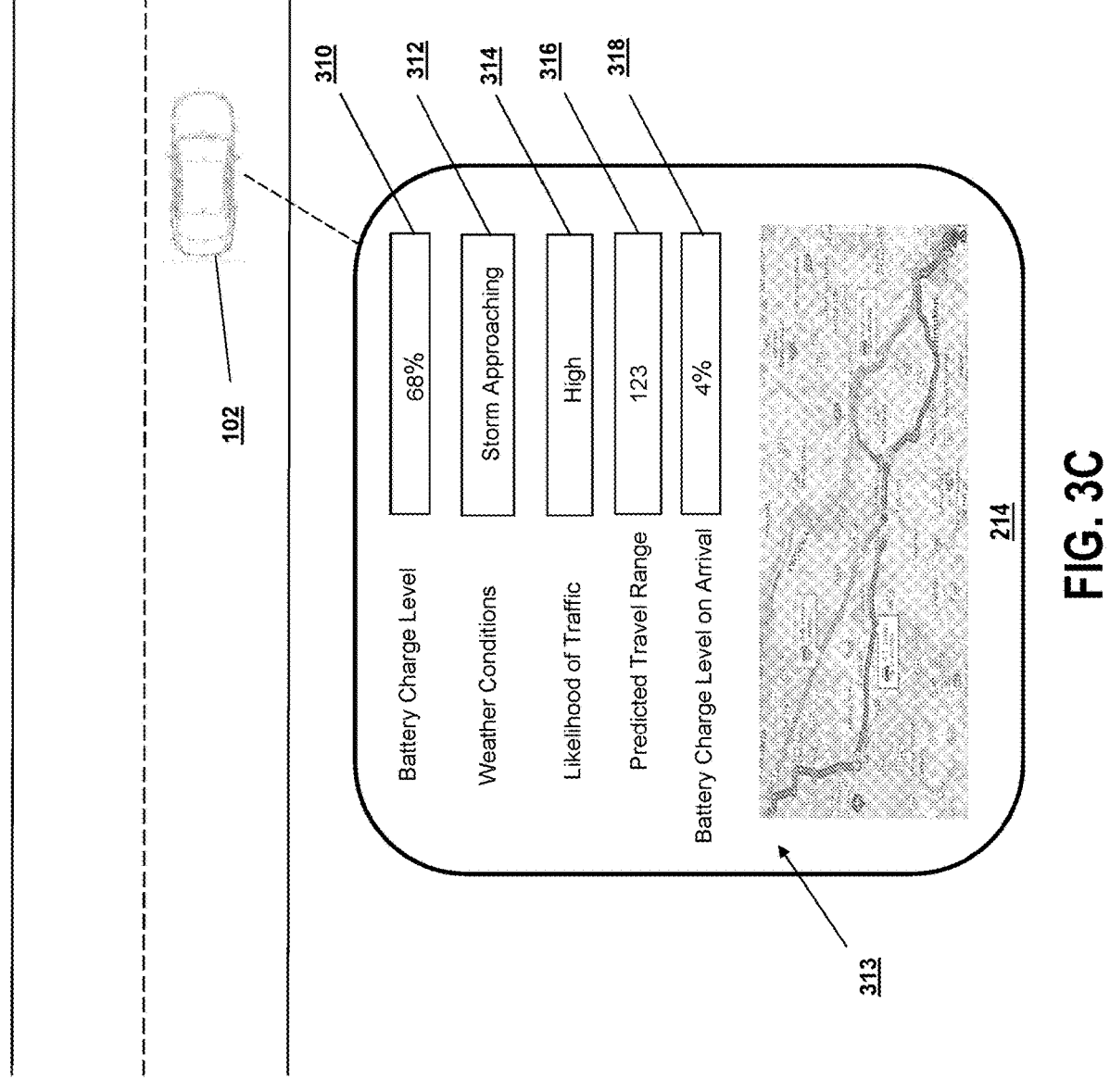
FIG. 3C depicts an interactive digital page that is dynamically updated and output on the display, according to one or more embodiments described and illustrated herein.

FIG. 3C depicts an interactive digital page 313 that is dynamically updated and output on the display 214, according to one or more embodiments described and illustrated herein. For example, as illustrated in FIG. 3C, the vehicle 102 is illustrated as having traveled approximately 72 miles along a particular mapped route that is 195 miles from the source location to the destination location. At this point along the route, the weather data may indicate a sudden change in weather conditions, such as due to, e.g., a storm that is likely to occur within, e.g., 1 mile, 2 miles, etc., from a particular point along the route (i.e. approximately 123 miles away from the destination).

In embodiments, the software application of the present disclosure, operating in conjunction with the travel range prediction system of the present disclosure, determines the effects of changes in predicted weather on the travel range, traffic conditions, and so forth, of the vehicle 102 along the route. In embodiments, historical data of one or more weather patterns (e.g., wind speed above 40 mph, rainfall, freezing temperatures, etc.), occurring within a particular proximity of the area is correlated with and/or analyzed in conjunction with historical traffic data in the area during and after the occurrence of such weather patterns. For example, the correlation and analysis may indicate that, historically, the occurrence of storms (e.g., wind speed above 40 mph and rainfall) have been accompanied by traffic jams at one or more locations along the route. Further, these traffic jams may have caused delays in wide ranging time frames.

As a non-limiting example, such correlation and analysis may also indicate the most frequently utilized detour routes, vehicle deviations, and so forth, during and after the occurrence of the storm, e.g., due to highway closures caused by flooding, accidents, and so forth. In embodiments, real time traffic data obtained by the automobile system 200 is analyzed in conjunction with historical traffic data in order determine likelihood of travel delays, traffic jams, and so forth. Further, in non-limiting examples, the historical and current traffic data is analyzed in conjunction with current and historical weather data in order to determine likelihood of traffic delays, traffic jams, and so forth. In some embodiments, the historical and current traffic data is analyzed in conjunction with current and historical weather data and the current and historical battery charge level (e.g., the battery charge level of the vehicle 102 and/or the battery discharge rate of the vehicle 102) in order to determine an updated battery charge level when the vehicle 102 arrives at the destination. Any permutation or combination of the above described data could be analyzed to facilitate prediction of the travel range of the vehicle.

Returning to FIG. 3C, in embodiments, subsequent to the performing of the analysis of the weather data, traffic data, and/or the battery charge level (current and/or historical) at a particular location along the route, e.g., when the vehicle 102 has traveled approximately 72 miles along a particular mapped route, the battery charge level on arrival 318 is updated to a value of 4%. For example, historical trends of weather and traffic data, upon analysis, indicates that travel times and/or distance to the destination is increased by, e.g., 20 minutes, 30 minutes, 5 miles, 10, miles, 15 miles, and so forth. Based on these calculations, the automobile system 200 determines a particular battery consumption amount based on the amount of time and/or distance that needs to be covered to reach the destination. It is noted that this increase in time and/or distance may include delays due to detours, highway closures, and so forth, as a result of the change in weather affecting travel (e.g., increase in weather severity).

In embodiments, as illustrated in FIG. 3C, the interactive digital page of the travel range prediction system of the present disclosure is updated in real time, such as due to change in current/forecasted weather and/or change in travel route. As such, the interactive digital page displays updated versions of, e.g., the current battery charge level 310 (e.g., 68%), the current weather condition 312 (e.g., Storm Approaching), the current likelihood of traffic value 314 (e.g., High), the travel range prediction 316 (e.g., 123), and the battery charge level upon arrival 318 (e.g., 4%).

In embodiments, one or more of the text fields is output on the display 214 such that the attention of the driver is drawn to these text fields. For example, one or more text fields are displayed in a prominent color (e.g., red) that is indicative of a warning. In other embodiments, one or more text fields are displayed in a prominent color (e.g., red) and an audio warning is output substantially concurrently with the updating of the text field to the prominent color. For example, if the analysis determines that the likelihood of traffic is "High", the automobile system 200 highlights the text field that includes the term "High" in red and the processor 202 outputs, via the speaker 222, an audio warning such as, e.g., ("Beware-Delays Ahead", or "Beware-Traffic Ahead"). In embodiments, the visual or the audio based warning is output sequentially or concurrently.

Figure 3D:
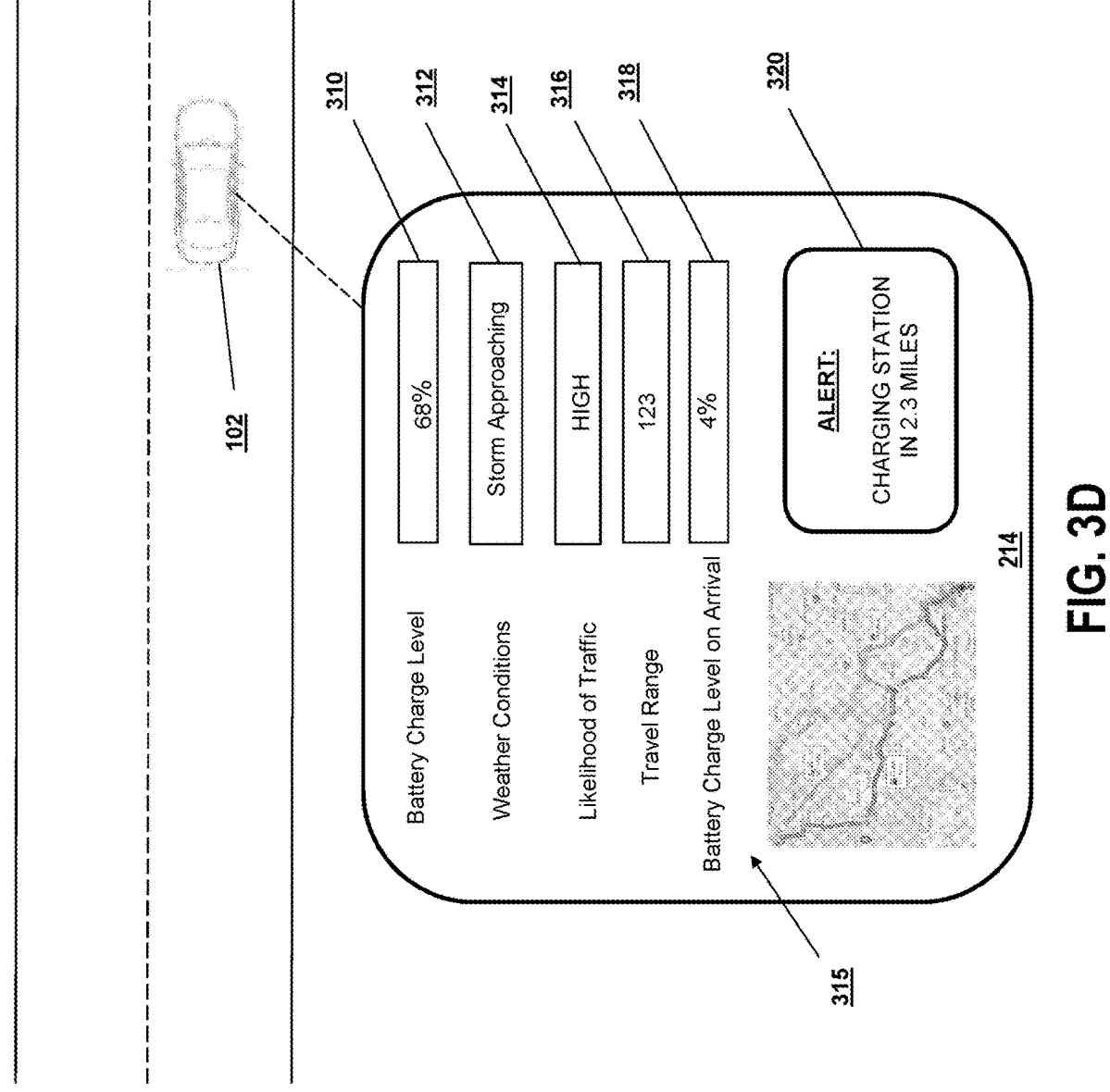
FIG. 3D depicts an example interactive digital page on which a recommendation is generated and displayed, according to one or more embodiments described and illustrated herein.

FIG. 3D depicts an interactive digital page 315 on which a recommendation 320 is generated and displayed, according to one or more embodiments described and illustrated herein. In embodiments, upon the updating of the interactive digital page as illustrated in FIG. 3C, the automobile system 200 identifies the battery charge level on arrival 318 (e.g., 4%) as being below a particular threshold level. In embodiments, a threshold level below 5% is associated with a dangerous condition. In embodiments, the threshold level is preprogrammed, such as by the user and/or as part of a default software setting. As such, in embodiments, the automobile system 200 operating in conjunction with the software of the present disclosure generates and outputs a recommendation, e.g., in real time, to warn the driver that charging the battery 216 is advisable.

For example, as illustrated in FIG. 3D, the automobile system 200 may generate a recommendation 320 that includes text for assisting the driver and avoiding problems, such as avoiding running out of battery charge prior to reaching a charging station (e.g., which is located within a particular proximity of the planned route). The generated recommendation 320 can also include a recommended detour, e.g., to timely reach a charging station and/or avoid inclement weather. For example, as shown in FIG. 3D, the generated recommendation 320 includes text indicating the location of an electric charging station within a particular proximity of the vehicle 102, which can be generated as a result of the determined battery charge level upon arrival 318 that is determined to be lower than the threshold level (e.g., 5% or 10% battery charge). In embodiments, it is noted that the determined battery charge level may be determined, as stated above, based in part on analyzing historical battery charge levels, variations in battery discharge rates, and/or combinations thereof.

In embodiments, the subject matter of the recommendation is output in audio form via the speaker 222. In other embodiments, the subject matter of the recommendation is displayed in the display 214 concurrently with the outputting of the recommendation in audio form via the speaker 222. In embodiments, a charging distance describes a location of one or more charging stations capable of charging the battery 216 of the automobile system 200. As illustrated in FIG. 3D, the charging distance is identified as 2.3 miles. In embodiments, based on the charging distance of 2.3 miles, the travel range prediction system of the present disclosure outputs a recommendation of "Charging Battery is Recommended." In embodiments, if the charging distance of one or more stations is in excess of a particular threshold, e.g., in excess of 5 miles, 10 miles, and so forth, the automobile system 200 generates a recommendation such as "Do not charge battery at this time", "Charge battery at a different location", and so forth.

Figure 4:
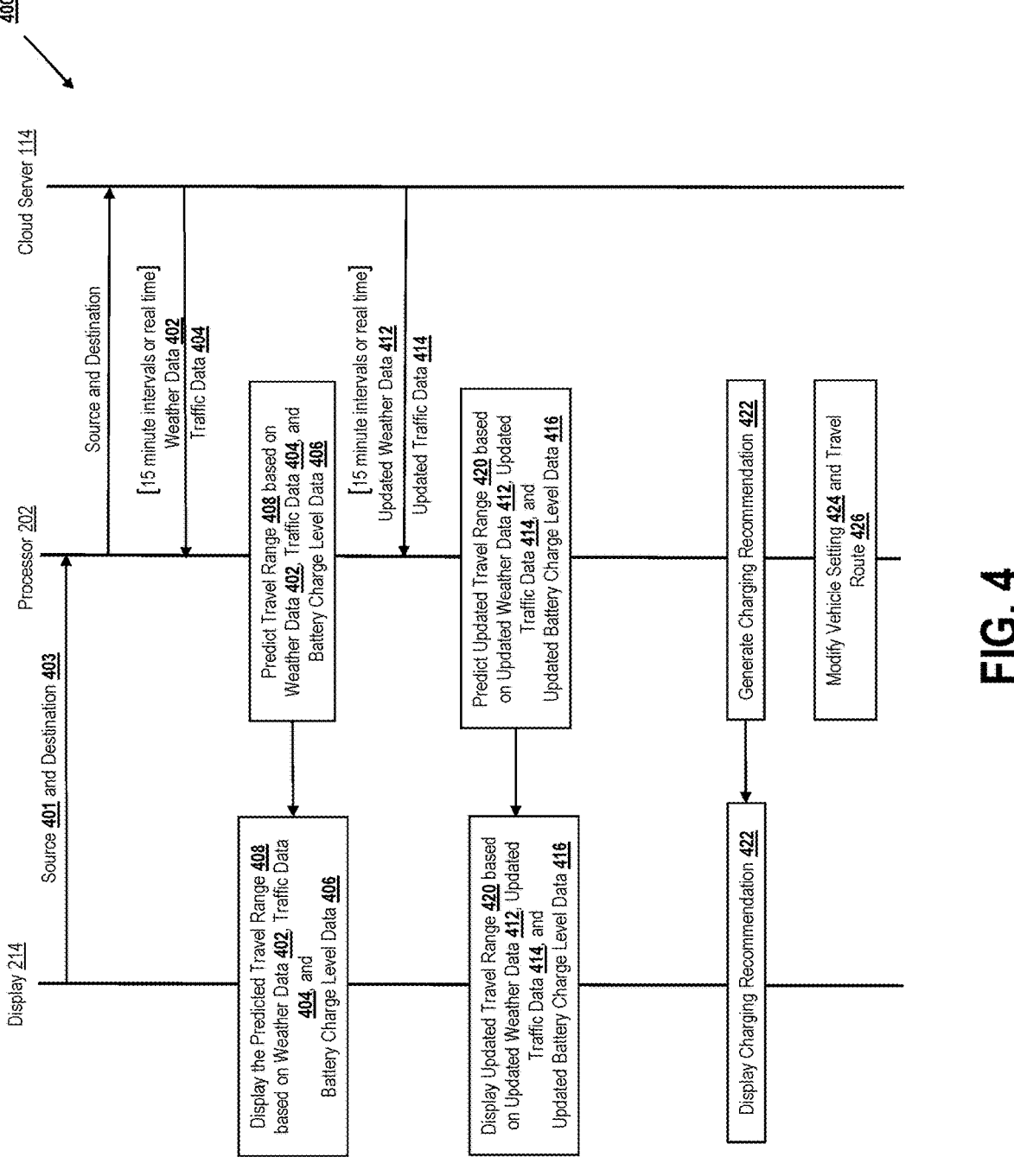
FIG. 4 illustrates various operations that occur to enable the prediction of a travel range of a vehicle, according to one or more embodiments described and illustrated herein.

FIG. 4 illustrates various operations that occur to enable the prediction of a travel range of a vehicle, according to one or more embodiments described and illustrated herein. As illustrated in FIG. 4, the display 214 of the automobile system 200 receives input of source and destination locations via an example digital interactive page that is output on the display 214. In embodiments, such an input is received via an audio command spoken by a driver, passenger, etc., or via information typed into a text field displayed on a touch screen display (e.g., the display 214). The data relating to the source and destination locations and/or one or more time based parameters is routed via the communication path 204 to the processor 202 and the memory 206 for storage. The processor 202 routes the data, via the communication interface 208, to the cloud server 114. In embodiments, each of the source and destination locations is associated with a particular time of departure and/or an anticipated and/or a desired time of arrival. For example, in embodiments, the time of departure is automatically identified as a current time that is substantially the same as the time associated with input of the source and destination locations. In some embodiments, the time of departure is preset, e.g., by a user, to be a time in the future. In some embodiments, a desired time of arrival is input by a user.

In some embodiments, the cloud server 114 transmits, operating independently or in conjunction with one or more additional servers, weather data 402, traffic data 404, map data (e.g., GPS), historical weather data, historical traffic data, and so forth, to the communication interface 208, which routes this data to the memory 206 for storage and the processor 202 for additional processing. These are non-limiting examples, as a plurality of other types of data may also be accessed and transmitted to the processor 202. In embodiments, based on the source 401 and the destination 403 locations, weather data and traffic data is accessed and transmitted by the cloud server 114 to the processor 202 on a real time basis at particular time intervals, e.g., 5 minute interval, 10 minute interval, or 15 minute interval. Other time intervals are also contemplated.

Thereafter, the processor 202 analyzes the received data as described in detail above and instructs the display 214 to output an interactive digital page that includes the predicted travel range 408 based on the weather data 402, the traffic data 404, and the battery charge level data 406. The predicted travel range 408 along with the battery charge level data 406 are output on the display 214, e.g., in real time.

In embodiments, updated weather data 412 and updated traffic data 414 is transmitted by the cloud server 114, e.g., within the time intervals described above, and an updated travel range 420 is predicted in real time. Further, the updated travel range 420 is displayed, e.g., alongside the updated weather data 412, the updated traffic data 414, and the updated battery charge level data 416 is displayed on the display 214, e.g., in real time. In some embodiments, based on the updated battery charge level, a recommendation 422 is generated and displayed (e.g., as illustrated in FIG. 3D) and at least one vehicle setting 424 and a travel route 426 is modified. In embodiments, the at least one vehicle setting 424 is associated with indications of remaining battery charge levels, and so forth.

Figure 5:
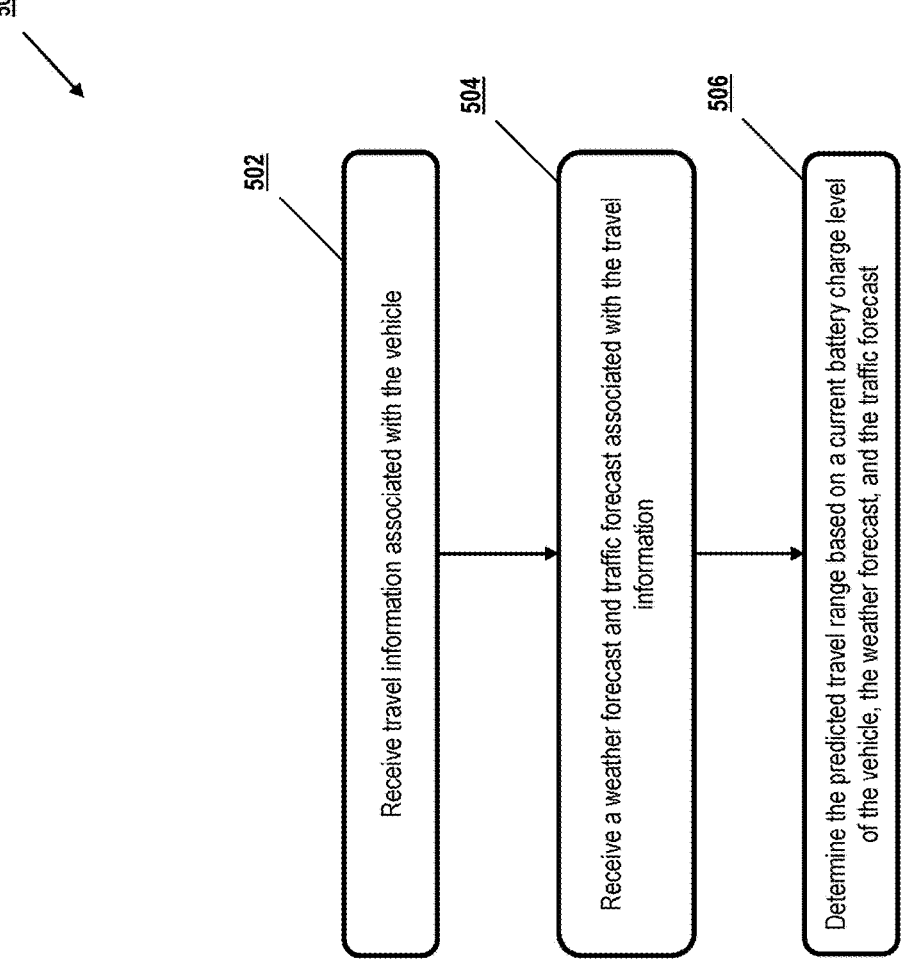
FIG. 5 illustrates a flow chart for predicting a travel range of a vehicle, according to one or more embodiments described and illustrated herein.

FIG. 5 illustrates a flow chart 500 for predicting a travel range of a vehicle, according to one or more embodiments described and illustrated herein. In some embodiments, one or more of the steps described in the flow chart 500 are performed (e.g., completely, partially, and/or the like) by the automobile system 200 (FIG. 2). In embodiments, the steps are also performed sequentially, simultaneously, and/or automatically and without user intervention. Additionally, or alternatively, in some embodiments, one or more steps described with respect to the process illustrated in the flow chart 500 are performed (e.g., completely, partially, and/or the like) by another device or group of devices operating in conjunction with or including the automobile system 200. In embodiments, the steps are also performed sequentially, simultaneously, and/or automatically and without user intervention.

In embodiments, in block 502, travel information associated with the vehicle is obtained. In embodiments, the travel information is map data that is received by the automobile system 200 from the cloud server 114 based on at least a source and destination location that is input into the travel range prediction system of the present disclosure (e.g., software operating in conjunction with the automobile system 200 of the present disclosure). In embodiments, the source and destination location is also associated with a time parameter or time component, e.g., a future departure time that is preset by a user, a desired arrival time that is preset by a user, and so forth. In embodiments, in addition to the map data, weather forecast data and traffic forecast data associated with the travel information, battery charge levels of the vehicle (e.g., the vehicle 102) is determined (block 504). In embodiments, in block 506, the travel range prediction system of the present disclosure determines the predicted travel range based on at least a current battery charge level of the vehicle, the weather forecast, and the traffic forecast. In embodiments, the predicted travel range is displayed on the display 214 of the vehicle 102. In embodiments, as described and illustrated in FIG. 3B, weather data, likelihood of traffic, predicted travel range, battery charge level on arrival, and the current battery charge level is output on the display 214, e.g., in real time.

In embodiments, the predicting of the travel range is based on at least one condition of the vehicle (e.g., the vehicle 102) and/or a driving characteristic of a driver. In embodiments, examples of at least one condition of the vehicle may include temperature of the battery 216, vehicle tire pressure, payload, and so forth. In embodiments, one or more driving characteristics of the driver is detected using one or more of the sensors 218 of the automobile system 200. For example, as described above, the one or more sensors 218 is a motion sensor, a proximity sensor, and so forth, which are capable of detecting movements of the driver. Further, the inward facing camera 210 is capable of capturing high resolution images, namely images of the face of the driving. In embodiments, these images and the motion data are analyzed to determine behavior pattern data specific to various drivers, which is incorporated as part of the analysis for determining the travel range prediction.

Further, the automobile system 200, operating in conjunction with the software application as described in the present disclosure, analyzes the subject matter of the images of the face to, e.g., determine pupil dilation, facial expressions associated with fear, surprise, anger, and so forth. This data is stored in the memory 206 of the automobile system 200.

Further, in embodiments, the automobile system 200 is configured to determine a charging distance parameter based on one or more of the weather forecast, traffic forecast, and the travel information. In embodiments, the charging parameter is associated with, e.g., one or more charging stations located within a particular proximity of a current location of the vehicle 102. In embodiments, based on the distance at which one or more of these charging stations are located (e.g., distance away from the current location of the vehicle 102), the automobile system 200, operating in conjunction with the software application associated with the travel range prediction system of the present disclosure, generates one or more recommendations. In embodiments, these one or more recommendations are displayed in real time, e.g., on the interactive digital page 315 Depending on the value of the distances at which one or more of these charging stations are located, the automobile system 200 outputs, as described above, a recommendation such as "Charging "Charging Battery is Recommended", "Do not charge battery at this time", "Charge battery at a different location", and so forth. In embodiments, these messages are displayed on the display 214 and output as voice messages via the speaker 222 substantially simultaneously. In embodiments, these messages are output on the display 214 or output as voice messages via the speaker 222.

In embodiments, the automobile system 200 is configured to update, using the at least one processor, the travel range based on one or more of a measured temperature associated with the vehicle, a change in the weather forecast, a change in the traffic forecast, and a change in the travel information (e.g., changed destination location, driver diversion from planned route, etc.). Further, in embodiments, the automobile system 200 is configured to modify, based on the range that is updated, one or more of a vehicle setting and a travel route for the vehicle. In embodiments, examples of travel settings that are updated include adjustments to the speed of the vehicle, adjustments to battery charge levels of the vehicle, recommendations for reducing usage of vehicle electronics such as, e.g., speakers, the display 214 (e.g., if used to display movies), and so forth. Finally, in embodiments, the automobile is further configured to provide, based on the travel range and a charging distance, a charging recommendation to a user. In embodiments, a charging distance describes a location of one or more charging stations capable of charging the battery 216 of the automobile system 200 within a particular distance from a location of the vehicle 102. In embodiments, as illustrated in FIG. 3D, a distance from a current location of the vehicle 102 at which the charging station is located is output on the interactive digital page 315. In embodiments, additional details related to the charging station are displayed on the interactive digital page 315. For example, an amount of time that the vehicle 102 would have to be parked in the charging station, the amount of time it would take for the battery 216 to be completely charged, e.g., charged 75%, 50%, 25%, and so forth, is displayed. In embodiments, a travel range prediction could also be updated in real time based on the amount of time it takes to charge the battery 216, the amount of time it takes for the vehicle 102 to travel to the charging station, and so forth. Further non-limiting aspects or embodiments are set forth in the following numbered clauses:

Clause 1: A method for predicting a travel range of a vehicle, comprising receiving, using at least one processor, travel information associated with the vehicle; receiving, using the at least one processor, a weather forecast and a traffic forecast associated with the travel information; and predicting, using the at least one processor, the travel range based on a battery charge level of the vehicle, the weather forecast, and the traffic forecast.

Clause 2: The method of clause 1, wherein the predicting of the travel range is based on at least one condition of the vehicle.

Clause 3: The method of clause 1 or 2, wherein the predicting of the travel range is based a driving characteristic of a driver.

Clause 4: The method of any of clauses 1 to 3, further comprising displaying, at a user interface, the travel range.

Clause 5: The method of any of clauses 1-4, further comprising determining, using the at least one processor, a charging distance parameter based on one or more of the weather forecast, the traffic forecast, and the travel information.

Clause 6: The method of clause 5, further comprising providing, based on the charging distance parameter, a travel recommendation to a user.

Clause 7: The method of any of clauses 1-6, further comprising updating, using the at least one processor, the travel range based on one or more of a measured temperature associated with the vehicle, a change in the weather forecast, a change in the traffic forecast, and a change in the travel information.

Clause 8: The method of clause 7, further comprising modifying, based on the travel range that is updated, one or more of a vehicle setting and a travel route.

Clause 9: The method of clause 7, further comprising providing, based on the travel range, the travel range that is updated, and a charging distance, a charging recommendation to a user.

Clause 10: A system, comprising at least one processor and at least one non-transitory storage media storing instructions that, when executed by the at least one processor, cause the at least one processor to perform operations comprising: receiving travel information associated with a vehicle; receiving a weather forecast and a traffic forecast associated with the travel information; and predicting a travel range based on a battery charge level of the vehicle, the weather forecast, and the traffic forecast.

Clause 11: The system of clause 10, wherein the travel range is further determined based on at least one condition of the vehicle.

Clause 12: The system of clause 10 or clause 11, wherein the travel range is further determined based a driving characteristic of a driver.

Clause 13: The system of any of clauses 10 to 12, wherein the operations further comprising: displaying, at a user interface, the travel range.

Clause 14: The system of any of clauses 10 to 13, wherein the operations further comprise: classifying, by the at least one processor, at least one object represented in the rectified first image.

Clause 15: The system of clause 14, wherein the operations further comprise providing, based on the charging distance parameter, a travel recommendation to a user.

Clause 16: The system of any of clauses 10 to 15, wherein the operations further comprise updating the travel range based on one or more of a measured temperature associated with the vehicle, a change in the weather forecast, a change in the traffic forecast, and a change in the travel information.

Clause 17: The system of clause 16, wherein the operations further comprise modifying, based on the travel range that is updated, one or more of a vehicle setting and a travel route.

Clause 18: The system of clause 16, wherein the operations further comprise providing, based on the travel range, the travel range that is updated, and a charging distance, a charging recommendation to a user.

Clause 19: At least one non-transitory storage media storing instructions that, when executed by at least one processor, cause the at least one processor to perform operations comprising: receiving travel information associated with a vehicle; receiving a weather forecast and a traffic forecast associated with the travel information; and predicting a travel range based on a battery charge level of the vehicle, the weather forecast, and the traffic forecast.

Clause 20: The at least one non-transitory storage media storing media of clause 19, wherein the travel range is predicted based on at least one condition of the vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
receiving, using at least one processor of a vehicle, data of an environment external to the vehicle, the data representative of a first time, and at least some of the data being based on geographic probability distributions associated with current and forecasted weather;

predicting a charge level of a battery of the vehicle associated with an arrival of the vehicle at a destination based, in part, on the at least some of the data that is based on the geographic probability distributions;
receiving, by the at least one processor, additional data of the environment external to the vehicle, the additional data representative of a second time, and the additional data indicative of a change in weather conditions in the environment external to the vehicle; and
predicting, based on the additional data, a new charge level of the battery in association with the arrival of the vehicle at the destination.

2. The method of claim 1, comprising outputting one or both of the predicted charge level of the battery or the predicted new charge level of the battery to a system configured to generate a travel route.

3. The method of claim 1, comprising outputting one or both of the charge level of the battery or the predicted new charge level of the battery on a display of the vehicle.

4. The method of claim 1, comprising generating, using the data of the environment external to the vehicle, a travel range associated with a source location and the destination.

5. The method of claim 4, wherein the generating of the travel range is based on a driving characteristic of a driver of the vehicle.

6. The method of claim 4, comprising outputting the travel range to a system configured to generate a travel route.

7. The method of claim 4, comprising outputting, on a display of the vehicle, the travel range.

8. The method of claim 4, comprising updating, using the at least one processor, the travel range based on one or more of a measured temperature associated with the vehicle, a change in a weather forecast, and a change travel information.

9. The method of claim 8, comprising modifying, based on the travel range that is updated, one or more of a vehicle setting and a travel route.

10. The method of claim 8, comprising providing, based on the travel range and a charging distance, a charging recommendation to a user.

11. The method of claim 1, wherein the vehicle comprises an aircraft.

12. The method of claim 11, wherein the vehicle comprises a drone.

13. The method of claim 1, wherein the vehicle comprises a passenger vehicle.

14. The method of claim 1, wherein the vehicle comprises an automobile.

15. The method of claim 1, wherein the vehicle comprises a vehicle other than an automobile.

16. The method of claim 1, comprising:
comparing the forecasted weather to the additional data indicative of a change in weather conditions in the environment external to the vehicle, and
analyzing the comparison.

17. A system, comprising:
at least one processor of a vehicle, and
at least one non-transitory storage media storing instructions that, when executed by the at least one processor, cause the at least one processor to perform operations comprising:
receiving data of an environment external to the vehicle, the data representative of a first time, and at least some of the data being based on geographic probability distributions associated with current and forecasted weather;

predicting a charge level of a battery of the vehicle associated with an arrival of the vehicle at a destination based, in part, on the at least some of the data that is based on the geographic probability distributions;

receiving additional data of the environment external to the vehicle, the additional data representative of a second time, and the additional data indicative of a change in weather conditions in the environment external to the vehicle; and predicting, based on the additional data, a new charge level of the battery in association with the arrival of the vehicle at the destination.

18. At least one non-transitory storage media storing instructions that, when executed by at least one processor, cause the at least one processor to perform operations comprising:

receiving data of an environment external to a vehicle, the data representative of a first time, and at least some of the data being based on geographic probability distributions associated with current and forecasted weather;

predicting a charge level of a battery of the vehicle associated with an arrival of the vehicle at a destination based, in part, on the at least some of the data that is based on the geographic probability distributions;

receiving additional data of the environment external to the vehicle, the additional data representative of a second time, and the additional data indicative of a change in weather conditions in the environment external to the vehicle; and predicting, based on the additional data, a new charge level of the battery in association with the arrival of the vehicle at the destination.

\* \* \* \* \*